(12) United States Patent
Klippel

(10) Patent No.: US 6,234,734 B1
(45) Date of Patent: *May 22, 2001

(54) BLIND FASTENER AND BLIND FIXING METHOD

(75) Inventor: Simon Klippel, Bradford (GB)

(73) Assignee: Glynwed International PLC, Birmingham (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,161

(22) PCT Filed: Jan. 18, 1996

(86) PCT No.: PCT/GB96/00101

§ 371 Date: Sep. 8, 1997

§ 102(e) Date: Sep. 8, 1997

(87) PCT Pub. No.: WO96/22470

PCT Pub. Date: Jul. 25, 1996

(30) Foreign Application Priority Data

Jan. 21, 1995 (GB) .................................................. 9501227

(51) Int. Cl.⁷ .................................................. F16B 13/06
(52) U.S. Cl. ........................................... 411/42; 411/60.1
(58) Field of Search .................. 411/55, 42, 49, 411/61, 38, 34, 60.1, 60.2, 80.1, 80.2, 9, 57.1, 39

(56) References Cited

U.S. PATENT DOCUMENTS

| | | | |
|---|---|---|---|
| 1,816,970 | * | 8/1931 | Hess .................. 411/60 |
| 3,515,028 | * | 6/1970 | Patton ................ 411/42 |
| 4,011,786 | * | 3/1977 | Leibig ............... 411/60.2 |
| 4,293,259 | * | 10/1981 | Liebig . |
| 4,330,230 | * | 5/1982 | Giannuzzi .......... 411/60.2 |
| 4,789,282 | * | 12/1988 | Abraham ............ 411/55 |
| 5,213,460 | * | 5/1993 | Sadri ................. 411/42 |
| 5,263,803 | * | 11/1993 | Anquetin ............ 411/55 |
| 5,383,753 | * | 1/1995 | Palm ................. 411/60 |

FOREIGN PATENT DOCUMENTS

| | | | |
|---|---|---|---|
| 3507022 | * | 8/1986 | (DE) .................. 411/34 |
| 0 536 957 A1 | | 4/1993 | (EP) . |
| 319996 | * | 11/1902 | (FR) .................. 411/55 |
| 945387 | | 5/1949 | (FR) . |
| 0 336 482 A3 | | 10/1989 | (FR) . |
| 553124 | | 5/1943 | (GB) . |
| 601453 | * | 5/1948 | (GB) .................. 411/55 |
| 2094919 | * | 9/1982 | (GB) .................. 411/60.2 |

* cited by examiner

Primary Examiner—Flemming Saether
(74) Attorney, Agent, or Firm—Workman, Nydegger & Seeley (57) ABSTRACT

A blind fastening method and device for use in clamping a component to a support plate, in which the fastener device is taken through aligned openings in the component and in the support plate, and comprises: a slotted sleeve; an apertured sleeve head at one end of the sleeve; a threaded fastener portion which can be taken through the apertured sleeve head and the sleeve; a tightening fastener head for tightening the fastener portion; and a diverging sleeve-expanding head mounted on the fastener portion and engageable with the opposite end of the sleeve to expand the latter radially outwardly to anchor the sleeve; in which the sleeve head has an off-set formation engageable to a tool which prevents rotation of the sleeve head while the fastener head is being tightened. This provides a primary deformation action, and in a preferred embodiment a secondary deformation action is provided so as to obtain a stronger clamping action, by means of an axially compressible weakened portion in the wall of the sleeve and located adjacent to the sleeve head.

25 Claims, 5 Drawing Sheets

BLIND FASTENER AND BLIND FIXING METHOD

BACKGROUND OF THE INVENTION

1. Field of the Invention

This invention relates to a blind fastener device, and also to a method of clamping a component to a support plate using a blind fastener device.

2. Description of the Related Art

It is of course well-known to provide anchor bolts for fixing to concrete, and in which an expanding sleeve is engaged by a conical head as the fixing is tightened, with the component parts of the sleeve moving radially outwardly into firm gripping engagement with the wall of the passage formed in the concrete to receive the fixing.

However, the invention is not primarily concerned with fixings of this type, (to anchor devices to concrete or brick work), but to the clamping of components to "rolled hollow metal sections" of the type being used increasingly as part of the supporting structure in current industrial building work. Support columns can be formed by square or rectangular box sections, built up from four metal rolled plate sections. When it is desired to secure fixing brackets, pipe supports, electrical conduits, (or any other components of the type used in an industrial building), to a hollow section, it is of course necessary to use "blind fasteners", since access cannot readily be obtained to the interior of the hollow section to complete the fastening operation. Therefore, using blind fasteners, an expanding sleeve is introduced through aligned openings in the section and the component to be clamped thereto, and a threaded portion is then rotated to draw a conical head into engagement with the inner end of the sleeve to expand the sleeve radially outwardly. The sleeve is usually slotted, so that it is composed of a number of axially extending portions forming separate "legs", each of which can be deformed outwardly by the conical head and thereby anchor the entire sleeve in the hollow section.

Conveniently, the conical head is temporarily attached to the inner end of the sleeve, so that the sleeve and conical head can be introduced as a single assembly through the opening in the hollow section, and then a threaded fastener can be taken through the component (to be clamped to the hollow section), pass through the head of the sleeve and into threaded engagement with an internal thread in the conical head, and further rotation of the threaded portion pulls the conical head into the inner end of the sleeve so as to expand the sleeve "legs" radially outwardly.

One known design of blind fastener for use with metal sections comprises a slotted sleeve, a conical head temporarily attached to the inner end of the sleeve e.g. by shearable connections, and a specially formed sleeve head at the opposite end of the sleeve to the conical head. The sleeve head comprises a gripping ring formed with a series of radially projecting teeth or other knurling, the purpose of which will be described below.

Evidently, once the sleeve has been introduced into the opening in the hollow section, and the threaded fastener e.g. a bolt is introduced into the sleeve, it is necessary to provide some means whereby rotation of the conical head is prevented so that the sleeve can be moved axially into the interior of the sleeve. In the known construction, in which the conical head is attached to the sleeve, the means for preventing rotation of the conical head comprises the specially formed sleeve head which is able to make gripping engagement with the wall of the opening in the hollow section. This works generally satisfactorily, but evidently it is important that the tolerances in the formation of the sleeve, and the opening in the hollow section, should be relatively close, so that the sleeve is a relatively tight sliding fit as it is introduced. This is necessary so that the surface formation on the sleeve head can make suitable gripping engagement with the wall of the opening in the metal section. This imposes a manufacturing cost, and also care and attention in the formation of the receiving holes in the hollow metal section. Evidently, if the sleeve is introduced into an over-sized opening, and the sleeve rotates freely in this opening while attempt is made to tighten the bolt, there will be idle rotation of the sleeve and the conical head and therefore no axial inward movement of the conical head.

BRIEF SUMMARY OF THE INVENTION

The invention therefore seeks to provide an improved method of clamping a component to a support plate using an improved blind fastener device taken through aligned openings in the component and in the support plate, and which in preferred use of the invention will comprise clamping of any suitable structural component e.g. a support plate or bracket to a hollow metal section.

The improvement which the invention seeks to provide is in ease of completion of the fixing assembly, and avoidance of any need for the sleeve to have to make a gripping i.e. non rotational fit within the opening.

According to one aspect of the invention there is provided a method of clamping a component to a support plate using a blind fastener device taken through aligned openings in the component and in the support plate, said fastener device comprising a slotted sleeve; an apertured sleeve head at one end of the sleeve and which head is over-sized relative to the opening in the component; a threaded fastener portion which can be taken through the aperture in the sleeve head and through the sleeve; a tightening fastener head engaging with the fastener portion; and a diverging sleeve-expanding head mounted on the fastener portion and engageable with the opposite end of the sleeve, said method comprising:

introducing the fastener device to the component in such a way that the sleeve, the threaded portion and the sleeve-expanding head project to one side from the opening in the component, and with said apertured sleeve head and said tightening fastener head being located on the other side of the opening in the component;

presenting said fastener device to the support plate so that the sleeve is received by the opening in the support plate, and said apertured head engages the surface of the component; and tightening the fastener head in order to draw the diverging head into engagement with the opposite end of the sleeve to expand the latter radially, in which a holding device is engaged with said apertured head to prevent rotation of the latter while said fastening head is being tightened.

The method of the invention therefore allows for easy fixing of a component to a support plate, in that close tolerances are not necessary (as is required by known blind fastener devices), and the fastener device can be a relatively loose fit in the openings in the component and the support plate, provided only that the sleeve head is over-sized relative to the opening in the component so that the sleeve head can seat on a bearing surface surrounding the entrance to the opening.

Any suitable holding device may be used to prevent rotation of the sleeve head, such as a spanner, or a special tool, provided that the sleeve head has a complementary formation to enable it to be engaged by the holding device.

The invention may be used to facilitate the assembly of industrial building structures, in which rolled hollow metal sections are being used, whereby support brackets and other components can be readily clamped to a hollow section e.g. a column, using the invention.

The formation on the sleeve head may comprise one or more flats or any other suitable formation off set from the axis of the threaded portion and engageable by a tool to prevent rotation of the sleeve.

The tightening head of the threaded fastener may take any suitable form, including a bolt head, or a head having a driving socket e.g. a hexagonal socket of the type driven by an Allen key.

The sleeve head may be formed, if required, with a recessed seating in which the tightening head can be entirely received, so that a flush assembly is obtained upon completion of the fixing.

According to a further aspect of the invention there is provided a blind fastener device for use in clamping a component to a support plate, by taking said fastener device through aligned openings in the component and in the support plate, and in which the fastener device comprises:

a slotted sleeve;

an apertured sleeve head at one end of the sleeve;

a threaded fastener portion which can be taken through the apertured sleeve head and the sleeve;

a tightening fastener head for tightening the fastener portion; and a diverging sleeve-expanding head mounted on the fastener portion and engageable with the opposite end of the sleeve, upon tightening of the fastener, in order to expand at least the opposite end of the sleeve generally radially outwardly to anchor the sleeve;

in which the sleeve head has a formation, off set from the axis of the threaded portion, which is engageable by a tool to prevent rotation of the sleeve head while the fastener head is being tightened.

The formation on the sleeve head may comprise one or more "flats" on the outer circumference of the head, though other formations may be provided, engageable by a special tool if required.

In one preferred method of use of a blind fastener device according to the invention, a specially designed holding and operating tool may be provided, which can present a partly assembled fastener device to an opening in the support plate, and which also can hold the sleeve head against rotation, and which allows a threaded fastener and a component (to be clamped to the support plate) to now be presented to the installed part assembly, and which can then be operated, or allow tightening of the fastener head which engages an internal thread of the sleeve-expanding head and which then draws this head into engagement with the sleeve to deform the latter outwardly.

Alternatively, the fastener device may be taken through the aligned holes in the component and the support plate so that the sleeve and the sleeve-expanding head project to one side of the support plate, and the sleeve head engages with the component. Tightening of the fastener head (with the sleeve head held against rotation) then causes the sleeve-expanding head to engage the sleeve and expand it so as to come into clamping engagement with the support plate. Further tightening then draws the component and the support plate into firm clamping engagement.

The expansion of the sleeve and the subsequent clamping together of the component and the support plate (by movement together along the axis of the threaded portion of the fastener device) constitutes a "primary deformation action" of the blind fastener device.

Advantageously, the device may incorporate a secondary deformation action, to provide improved transmission of axial (compressive) thrust to the component and to the support plate during tightening. Evidently, the greater the degree of compressive thrust applied to the component and to the support plate, the greater will be the engagement pressure between their mating surfaces, and which will increase the frictional resistance to relative translational movement i.e. parallel to the planes of the support plate or perpendicular to the axis of the fastener. This frictional resistance will be additional to the shear resistance provided by the sleeve.

Preferably, the secondary deformation action is provided by means of a deformable portion provided in the sleeve and which is axially compressible to reduce the overall length of the sleeve and to allow the tensile load generated in the threaded portion to be transferred to the sleeve head which tightly engages the surface of the component. Thus, tightening of the fastener head pulls the sleeve-expanding head axially of the threaded portion and by the engagement of the expanding sleeve with the support plate, the support plate is pressed towards the component, which in turn is engaged by the sleeve head. The axially deformable portion of the sleeve then undergoes compressive reduction in its length, thereby reducing the overall length of the sleeve, and the sleeve head and the sleeve expanding head can move relatively closer to each other in order to firmly clamp the component and the support plate tightly together.

The axially compressible portion of the sleeve may comprise a deliberate weakening formed in the wall of the sleeve, and preferably this is arranged closely adjacent to the connection of the sleeve head with the sleeve.

The sleeve-expanding head may be temporarily attached to the inner end of the sleeve, by readily shearable connections, so that a joint assembly can be readily introduced into the opening in the support plate, and the head can be held against rotation while it is engaged by the inner end of the threaded portion e.g. a bolt, but in which the connections can be readily sheared as the head of the fastener is tightened, while the sleeve head remains held against rotation by the special tool.

BRIEF DESCRIPTION OF THE DRAWINGS

Preferred embodiments of the invention will now be described in detail, by way of example only, with reference to the accompanying drawing, in which:

FIGS. 6a, b and c show successive stages in a method of fastening a component to a hollow section; and, FIGS. 7a, b and c show successive stages in fastening a component to a support plate, utilising a further embodiment of blind fastener device having both a primary deformation action, and also a secondary deformation action during clamping.

DETAILED DESCRIPTION OF THE INVENTION

Figure 1:
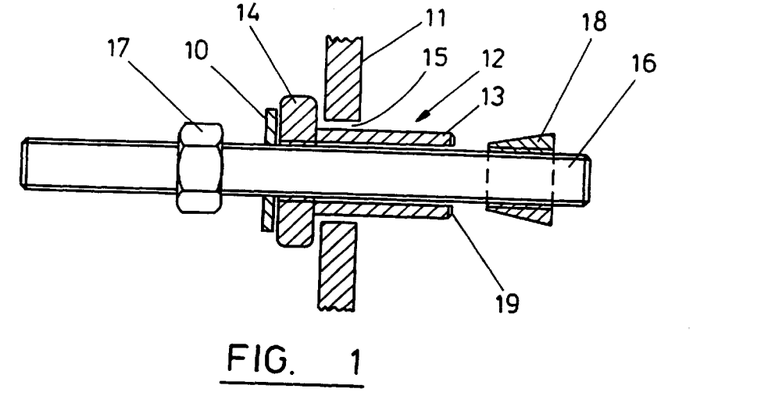
FIG. 1 is a longitudinal sectional view of a blind fastener device according to the invention, and for use in a clamping method according to the invention.
Figure 2:
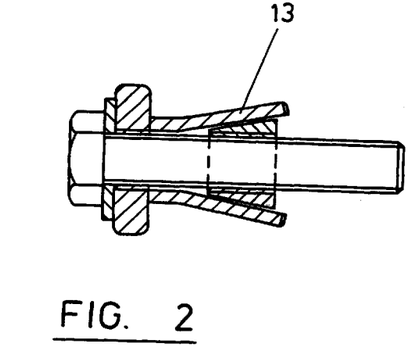
FIG. 2 is a view, similar to FIG. 1, showing a slotted sleeve of the fastener device after it has undergone radial expansion to an anchoring position.

Referring first to FIG. 1 of the drawings, it will be assumed, for the sake of example only, that the component which the blind fastener device is being used to clamp is a fixing plate 10 e.g. a flange of a mounting bracket. The fixing will be made to a support plate 11 which forms part of a hollow rolled metal section e.g. a square or rectangular cross-section box shaped column (not shown). The blind fastener device according to the invention is designated generally by reference 12, and comprises a slotted sleeve 13 which is generally cylindrical, and composed of separate arcuate portions separated by axially extending slots. An apertured sleeve head 14 is provided at one end of sleeve 13, and head 14 is over-sized relative to the opening 15 formed in support plate 11, and a threaded fastener portion 16 can be taken through the apertured sleeve head 14 and also through the sleeve 13 as shown in FIG. 1. A tightening fastener head 17 e.g. a bolt head is provided at one end of the threaded portion 16, and a diverging sleeve-expanding head 18 is provided at the opposite end of the fastener portion 16. Conveniently, head 18 is frusto-conical. Evidently, upon tightening of the fastener (assuming conical head 18 is restrained against rotation), the head 18 will be drawn axially towards the inner end 19 of sleeve 13, and then can radially expand the separate "legs" of the sleeve 13 as shown in FIG. 2, to take up an anchoring position within support plate 11 i.e. on the "blind side" of the support plate 11.

The conical head 18 may be restrained against rotation in any convenient manner, and one example only will comprise temporary attachment of head 18 to the inner end 19 of sleeve 13, whereby they can be introduced through opening 15 as a unitary assembly during installation of the blind fastener.

It will be evident from the drawings that the fastener device and the component 10 can be first assembled, and with sleeve 13, threaded portion 16 and head 16 projecting to one side of the opening in component 10 through which they extend. However, tightening head 17 is located on the other side of component 10, and tightening of head 17 can clamp the entire assembly of component 10, support plate 11, and blind fastener device 12 into a firmly clamped engagement.

After assembly of the component 10 and the blind fastener device 12, this assembly is then presented to the support plate 11 so that the sleeve 14 is received by the opening 15 in the support plate 11, and the sleeve head 14 is moved into engagement with the surface of the support plate 11 surrounding the entrance to opening 15. Upon tightening of the fastener head 17, and with conical head 18 restrained from rotation in a manner to be described below, the head 18 engages the inner end 19 of the sleeve 13 to expand the latter radially as described above. In a preferred arrangement, not shown in detail in the drawings, the conical head 18 is temporarily attached to the inner end of sleeve 13, and therefore it is only necessary to provide some means whereby sleeve 12 can be prevented from rotation during tightening of the fastener.

This is achieved by providing a holding device (not shown), which may be a spanner, or a special tool, which is engaged with the sleeve head 14 to prevent rotation of the latter. Sleeve head 14 may have one or more "flats" on its outer circumference, so that it can be engaged by a spanner, or it may have some other formation (not shown), off-set from the axis of-threaded portion 16, and engageable by a tool so that rotation of sleeve 12 can be prevented while head 17 is being tightened.

Therefore, sleeve 12 can have a relatively loose fit within opening 15, without any adverse effect on the strength and reliability of the clamping which is achieved.

Figure 3:
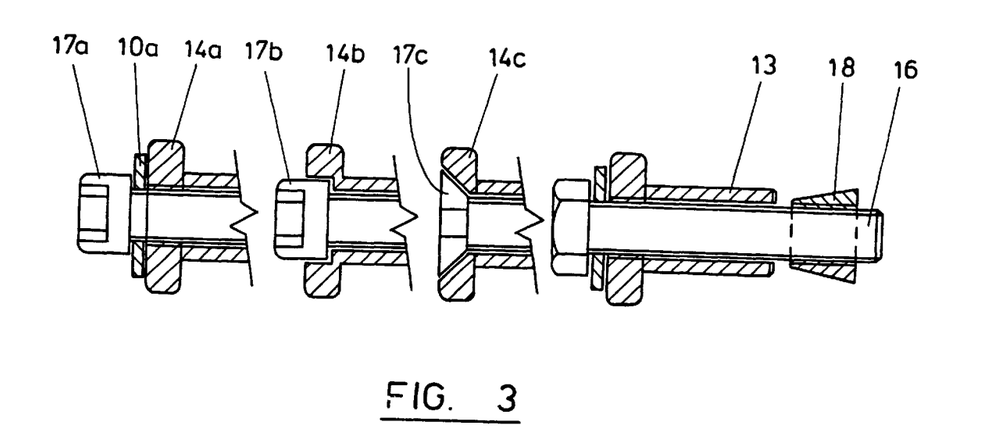
FIG. 3 shows a number of alternative designs of sleeve head and fastener head.

FIG. 3 shows different constructions of tightening head, shown by references 17a, 17b and 17c, and in respect to heads 17b and 17c, it will be noted that head 17c is entirely housed within the sleeve head 14c, whereas in the case of head 17b, it is only partly housed within sleeve head 14b. Also, FIG. 3 shows support plate 10a clamped between tightening head 17a and sleeve head 14a, but evidently the support plate could be mounted on sleeve 13 if required, i.e. the positions of sleeve 13 and component plate 10 (see FIG. 1) could be reversed, in which case plate component 10 can be tightly clamped against the surface of support plate 11, and with the sleeve head 14 comprising the outer projection of the clamped assembly.

Figure 4:
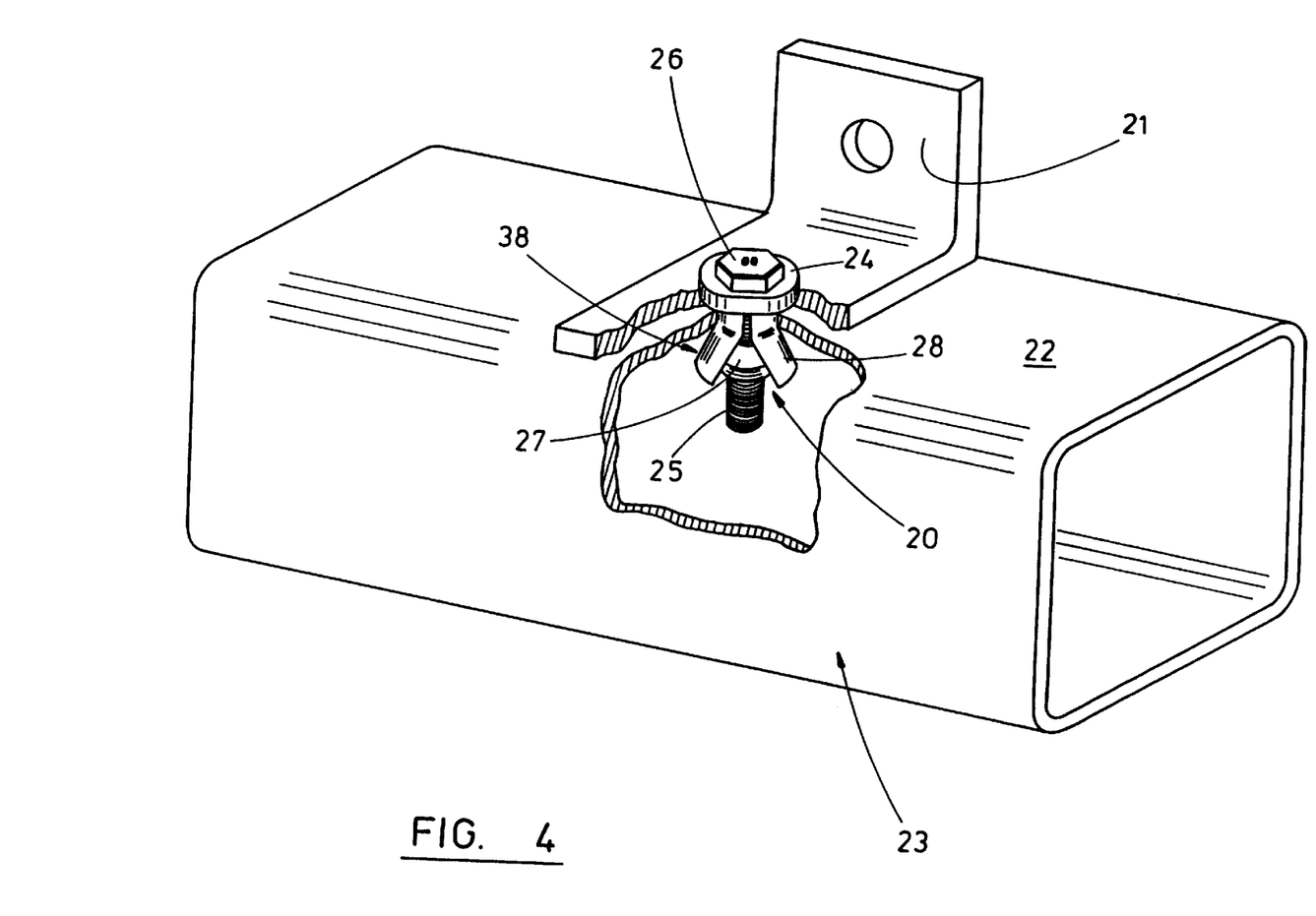
FIG. 4 is a perspective illustration showing the use of the blind fastener device to clamp together an angle bracket component to a hollow section.

Referring to FIG. 4, this shows a perspective illustration of use of a blind fastener device according to the invention, designated generally by reference 20, in order to clamp together an angled bracket component 21 to a support plate 22 which forms an integral component of a hollow box section tube 23, and which may comprise a rolled steel fabrication of the type used to form a support column, or beam for use in industrial building. This shows sleeve head 24 engaging directly with the surface of the bracket 21, adjacent the hole formed therein, and a bolt 25 having a head 26 which can be tightened (with sleeve head 24 held against rotation) in order to draw sleeve-expanding head 27 into engagement with the separate legs 28 of sleeve (designated generally by reference 38) to expand part radially outwardly and thereby into clamping engagement with the underside of the support plate 22, within the interior of the hollow section 23.

Figure 5:
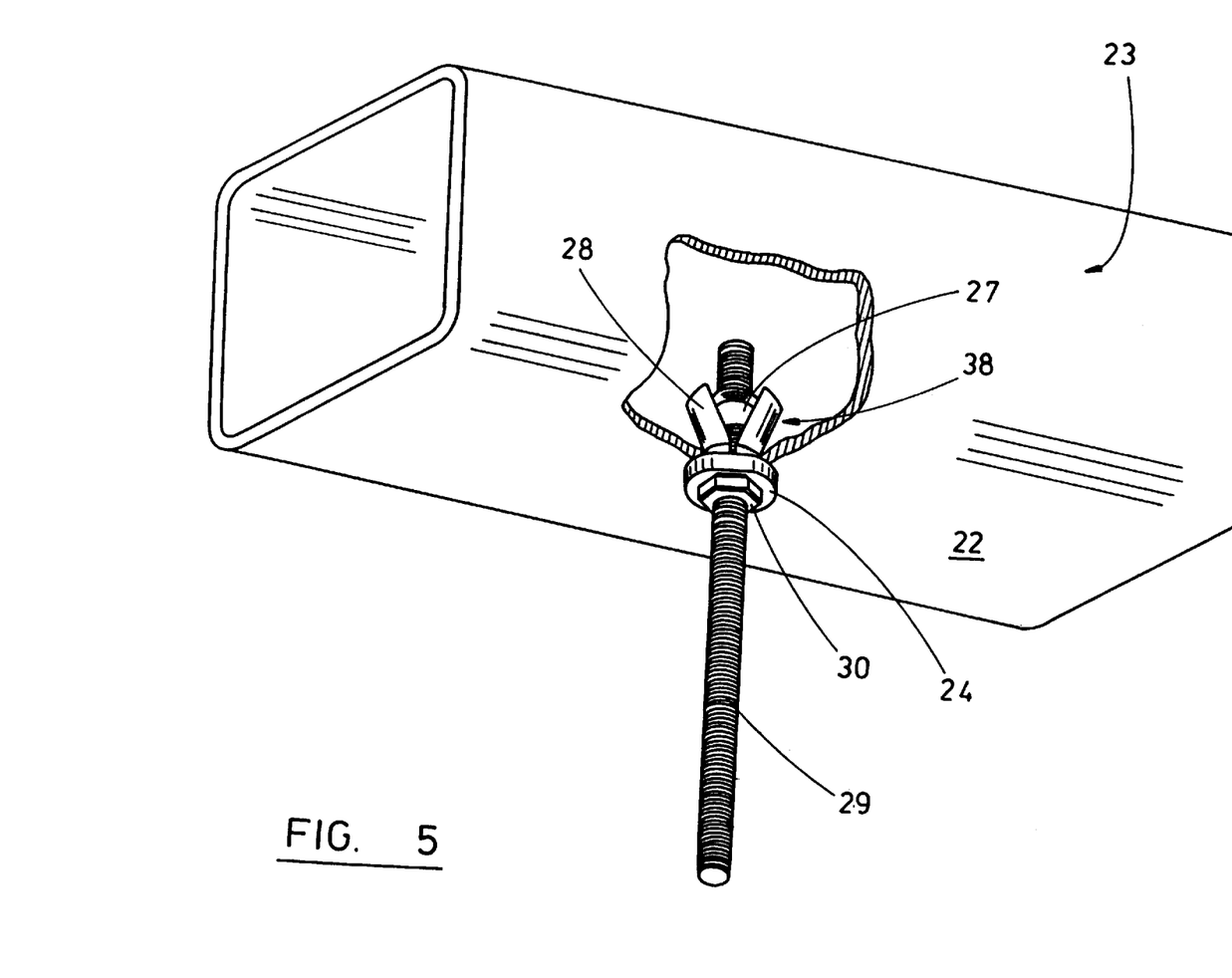
FIG. 5 is a view, similar to FIG. 4, showing an alternative mode of use of the blind fastener device in order to clamp a component to a support plate forming part of a hollow section.

FIG. 5 shows an alternative use of a blind fastener device and method according to the invention, in which a drop rod 29 has a threaded portion which is engaged by nut 30 which tightens against sleeve head 24, to expand the head 27 and sleeve legs 28, as shown, and generally similar to FIG. 4, upon tightening of nut 30. Any suitable components may then be clamped to the blind fastening assembly, by suitable engagement with the lower end of the drop rod 29. Examples of components which may be suspended by the blind fastening device shown in FIG. 5 will includes pipework used in sprinkler systems, other pipes and conduit, and cable trays.

Figure 6:
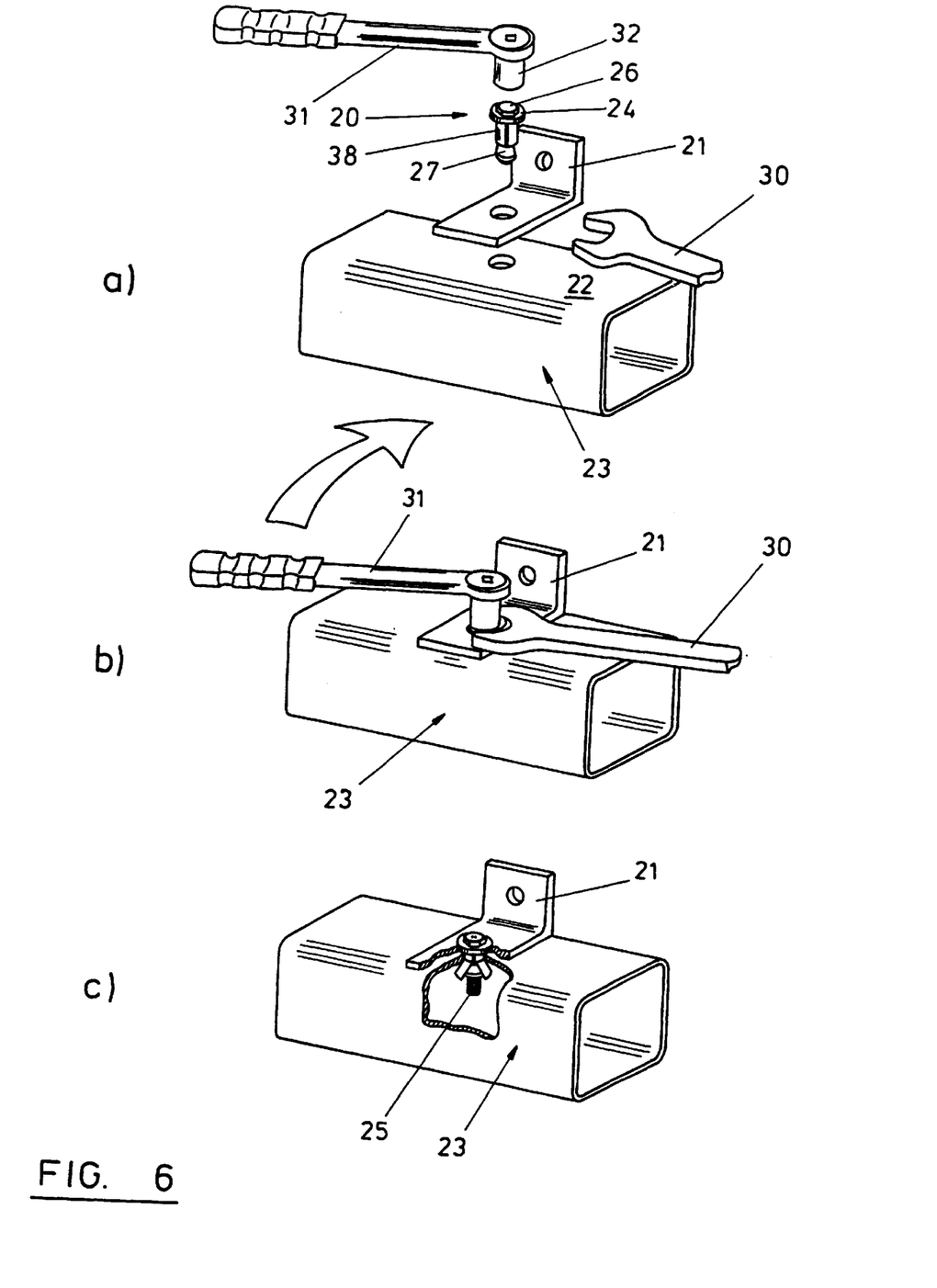

FIGS. 6a, b and c show successive stages in a method of assembly according to the invention, utilising the blind fastener devices shown in the previous figures. For convenience, the reference numerals applied in FIG. 4 are also used in FIGS. 6a to 6c.

As can be seen in FIGS. 6a to 6c, an open ended spanner 30 is used to hold the sleeve head 24 against rotation, while a hand operated ratchet drive tool 31 applies tightening rotation to bolt head 26 via a suitable socket 32.

The preferred embodiments of the invention provide simplified assembly of components which are to be clamped to a support plate structure, and without need to exercise close control over the tolerances in the formation of the sleeve 13 and the openings through which it is taken.

Further, fixing operations are simplified for installers, and who may, if required, be provided with special tools which can permit one handed operation of introduction and presentation of the component and blind fastener device to the opening in the support plate, and subsequent tightening to clamp the assembly.

Finally, referring to FIGS. 7a to 7c, this shows a preferred additional deformation facility which may be incorporated in a blind fastener device according to the invention.

Figure 7:
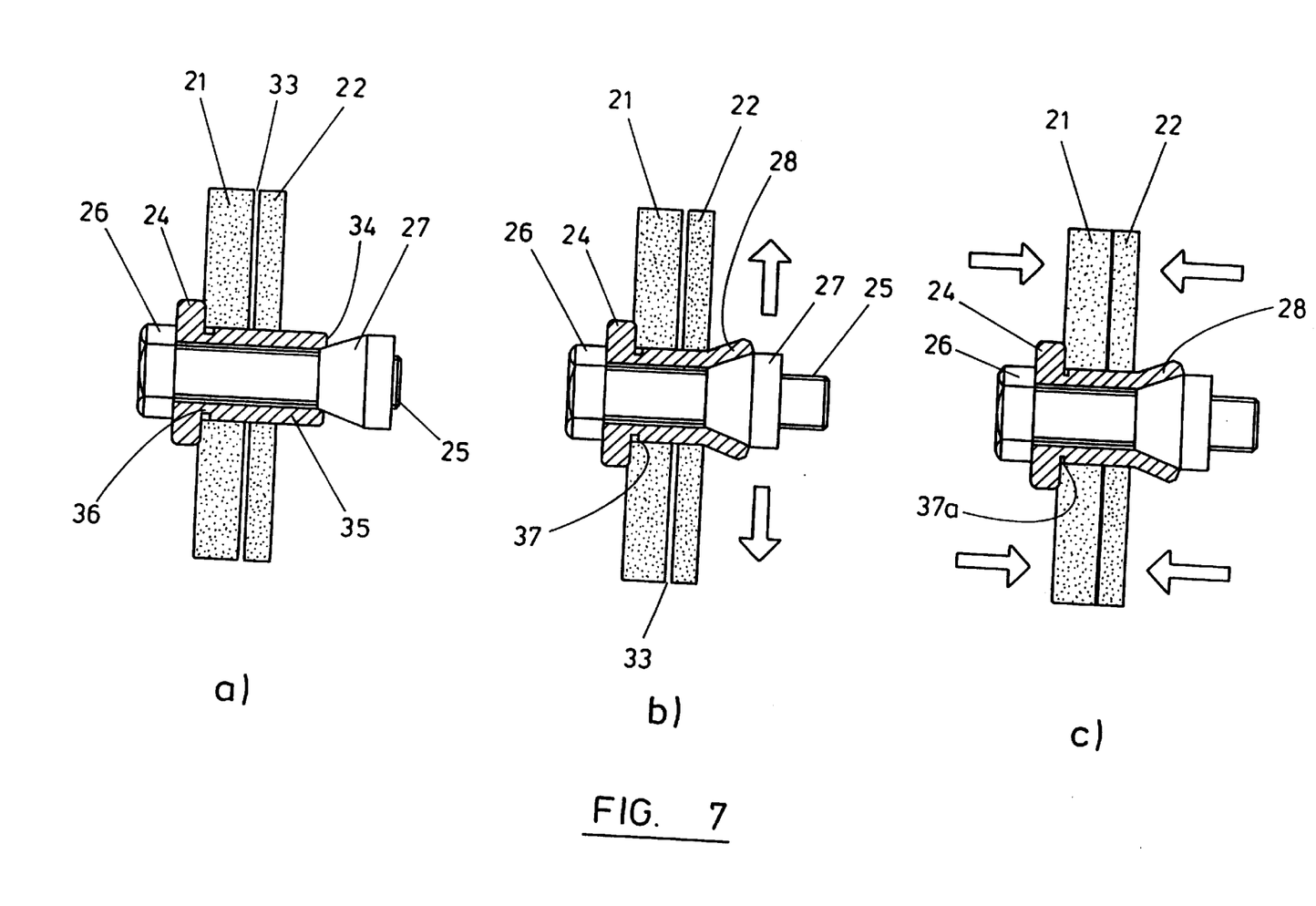

The embodiments of blind fastener device described and illustrated in FIGS. 1 to 6 incorporate a primary deformation action, by way of part radial outward expansion of the separate "leg" portions of the expanded sleeve. However, in some situations e.g. use in larger diameter hole fixings, it may be desirable to provide a stronger clamping action, and which may be achieved by incorporating a secondary deformation action. This is provided, by way of example, in the embodiment shown in FIGS. 7. Parts corresponding with those already described are given the same reference numerals, and will not be described in detail again. FIG. 7a shows initial assembly of component 21 to support plate 22 of a hollow section, and with a clearance gap 33 defined between the facing surfaces of component 21 and plate 22. FIG. 7a also shows the conical head 27 just coming into engagement with the inner end 34 of expanding sleeve 35.

FIG. 7b shows the primary deformation action which takes place as head 27 moves into engagement with the sleeve end 34, thereby deforming the separate sleeve "legs" 28 part radially outwardly so as to come into clamping engagement with the "blind" inner face of support plate 22 which surrounds the opening formed in it. FIG. 7b shows that the clearance gap 33 between component 21 and plate 22 is still present.

To provide a secondary deformation action, the sleeve 35 is provided with an axially compressible portion, and which is provided by any suitable deformable portion which allows the overall length of the sleeve to shorten under compressive load. Conveniently, this is provided by a deliberate weakening of the wall strength of the sleeve 35, and this may be provided adjacent to the sleeve head 24. This is shown in FIGS. 7a and 7b by provision of a neck region 36, which can be seen to be of reduced wall thickness relative to the remainder of the sleeve 35. The neck 36 is formed by providing a peripheral groove or recess 37 (see FIG. 7b) which thereby weakens the wall of the sleeve 34 and allows this weakened portion to deform axially under compressive stress i.e. to reduce its axial extent, as can be seen particularly in FIG. 7c. The peripheral recess 37 has a reduced axial extent, as shown by reference 37a in FIG. 7c, and from this it will be noted also that the clearance gap 33 has now been fully taken-up, and component 21 and support plate 22 are now clamped tightly into pressure contact between their facing surfaces. This gives considerably increased frictional resistance to relative translational movement between component 21 and 22, and this is additional to any resistance to relative translational movement which will be provided by the shear strength of the sleeve 35.

Thus, as the head 26 of the bolt is tightened, it first of all causes primary deformation action as shown in FIG. 7b, and then goes on to perform secondary deformation action as shown in FIGS. 7c. The tensile load generated in the bolt is transferred to the sleeve head 24, and to the expanding legs 28 of the sleeve, as a compressive force which draws the component 21 and plate 22 tightly together while the sleeve length reduces by axial compression of the peripheral recess or groove 37 to the reduced axial extent shown by reference 37a.

What is claimed is:

1. A method comprising the steps of:
   (a) positioning a component having an opening therein adjacent to a support member having an opening therein so that the openings are aligned, the support member having a wall with an interior surface bounding a hollow section, the opening of the support member extending through the wall to the hollow section;
   (b) passing an end of a blind fastener through the aligned openings of the component and the support plate such that at least a portion of the end of the blind fastener is freely disposed within the hollow section, the blind fastener comprising:
      (i) a slotted sleeve having a first end and an opposing second end, the slotted sleeve defining a compression groove at least partially encircling the slotted sleeve;
      (ii) an apertured sleeve head secured at the first end of the slotted sleeve;
      (iii) an elongated fastener extending through the sleeve head and slotted sleeve;
      (iv) a fastener head disposed on the fastener adjacent to the sleeve head; and
      (v) an expanding head disposed on the fastener adjacent to the second end of the slotted sleeve;
   (c) tightening the fastener head so that the expanding head is advanced into the second end of the slotted sleeve so as to radially outwardly bias the second end of the slotted sleeve without significantly axially compressing the slotted sleeve, the second end of the slotted sleeve being radially outwardly biased within the hollow section of the support member such that the second end of the slotted sleeve has an enlarged outer diameter greater than the diameter of the opening formed through the wall of the support member; and
   (d) further tightening the fastener head such that the slotted sleeve is axially compressed at the compression groove so that the component and support plate are pressed together between the apertured sleeve head and the radially outwardly biased second end of the slotted sleeve.

2. A method as recited in claim 1, wherein the step of tightening comprises rotating the fastener head which is threadedly engaged on the elongated fastener, the expanding head being rigidly secured on the elongated fastener.

3. A method as recited in claim 1, wherein the step of tightening comprises rotating the fastener head which is rigidly secured on the elongated fastener, the expanding head being threadedly engaged on the elongated fastener.

4. A method as recited in claim 1, wherein the step of positioning a component having an opening therein adjacent to a support member comprises the support member being a hollow section of steelwork, the hollow section having an elongated tubular configuration.

5. A method as recited in claim 1, wherein the step of tightening the fastener head comprises mechanically holding the apertured sleeve head in a stationary position while the fastener head is selectively rotated.

6. A structural assembly comprising:
   (a) a blind fastener comprising:
      (i) a slotted sleeve having a first end and an opposing second end the second end terminating at a terminus, a plurality of spaced apart slots substantially extending from the second end to the first end;
      (ii) an apertured sleeve head disposed at the first end of the slotted sleeve;

(iii) an elongated fastener extending through the sleeve head and slotted sleeve;

(iv) a fastener head disposed on the fastener adjacent to the sleeve head;

(v) an expanding head disposed on the fastener adjacent to the second end of the slotted sleeve, the expanding head being configured to advance into the second end of the slotted sleeve so as to radially outwardly bias the second end of the slotted sleeve when the fastener head is initially tightened; and (vi) means formed on the slotted sleeve for reducing the over all length of the slotted sleeve after the second end of the slotted sleeve is radially outwardly biased by further tightening of the fastener head;

(b) a component having an opening extending therethrough;

(c) a support member having a wall with an opening extending therethrough, the opening of the component and the support member being aligned, the blind fastener being passed through the aligned openings of the component and the support member such that:

(i) the fastener head is disposed on the side of the component opposite the support member; and (ii) at least a portion of the second end of the slotted sleeve is disposed on the side of the wall of the support member opposite the component, the slotted sleeve being outwardly biased so as to directly press against the wall of the support member, the terminus at the second end of the slotted sleeve being freely exposed and spaced apart from the wall of the support member at a distance along the fastener.

7. A structural assembly as recited in claim 6, wherein the means for reducing the over all length of the slotted sleeve comprises a compression groove formed on the slotted sleeve, the compression groove producing a deformable portion on the slotted sleeve.

8. A structural assembly as recited in claim 7, wherein the compression groove encircles the slotted sleeve.

9. A structural assembly as recited in claim 7, wherein the compression groove is formed at the first end of the slotted sleeve.

10. A structural assembly as recited in claim 6, wherein the fastener head is threadedly engaged on the elongated fastener and the expanding head is rigidly secured on the elongated fastener.

11. A structural assembly as recited in claim 6, wherein the fastener head is rigidly secured on the elongated fastener and the expanding head is threadedly engaged on the elongated fastener.

12. A structural assembly as recited in claim 6, wherein the structural member comprises an elongated tubular member having an interior surface, the interior surface bounding a hollow channel, at least a portion of the second end of the slotted sleeve being freely disposed within the hollow channel.

13. A structural assembly as recited in claim 6, wherein the structural member comprises a metal plate.

14. A structural assembly as recited in claim 6, further comprising:

(a) the opening of the support member having a diameter; and (b) the expanding head of the blind fastener being advanced into the second end of the slotted sleeve so as to radially outwardly bias the second end of the slotted sleeve such that the second end of the slotted sleeve has a diameter greater than the diameter of the opening of the support member.

15. A structural assembly as recited in claim 6, wherein the apertured sleeve head is fixed and integrally formed to the slotted sleeve.

16. A blind fastener comprising:

(a) a slotted sleeve having a first end and an opposing second end, the slotted sleeve determining a compression groove at least partially encircling tile slotted sleeve at the first end thereof and the slot substantially extending from the second end to the first end;

(b) an apertured sleeve head secured at the first end of the slotted sleeve, the apertured sleeve head being fixed and integrally formed to the slotted sleeve;

(c) an elongated fastener extending through the sleeve head and slotted sleeve;

(d) a fastener head disposed on the fastener adjacent to the sleeve head; and (e) an expanding head disposed on the fastener adjacent to the second end of the slotted sleeve, the expanding bead being configured to advance into the second end of the slotted sleeve when the fastener head is tightened, the slotted sleeve being configured such that the second end of the slotted sleeve is radially outwardly biased when the expanding head is first received therein and the slotted sleeve is subsequently axially compressed at the compression groove after the second end of the slotted sleeve is radially outwardly biased when the fastener head is further tightened.

17. A blind fastener as recited in claim 16, wherein the fastener head is threadedly engaged on the elongated fastener and the expanding head is rigidly secured on the elongated fastener.

18. A blind fastener as recited in claim 16, wherein the fastener head is rigidly secured on the elongated fastener and the expanding head is threadedly engaged on the elongated fastener.

19. A blind fastener as recited in claim 16, in which the sleeve head has at least one flat.

20. A blind fastener as recited in claim 16, wherein the slotted sleeve comprises a plurality of spaced apart slots substantially extending from the second end to the first end.

21. A structural assembly comprising:

(a) a blind fastener as recited in claim 16, the second end of the slotted sleeve terminating at a terminus;

(b) a component having an opening therein; and (c) a support member having a wall with an opening extending therethrough, the opening of the component and the support member being aligned, the blind fastener being passed through the aligned openings of the component and the support member such that:

(i) the fastener head is disposed on the side of the component opposite the support member; and (ii) at least a portion of the second end of the slotted sleeve is disposed on the side of the wall of the support member opposite the component, the slotted sleeve being outwardly biased so as to directly press against the wall of the support member, the terminus at the second end of the slotted sleeve being freely exposed and spaced apart from the wall of the support member at a distance along the fastener.

22. A structural assembly as recited in claim 21, wherein the structural member comprises an elongated tubular member having an interior surface, the interior surface bounding a hollow channel, at least a portion of the second end of the slotted sleeve being freely disposed within the hollow channel.

23. A blind fastener comprising:

(a) a tubular slotted sleeve having a first end with a sleeve head radially outwardly projecting therefrom and an opposing second end, the slotted sleeve bounding a compression groove encircling the slotted sleeve directly adjacent to the sleeve head, the slotted sleeve having a uniform thickness extending from the compression groove to the second end of the slotted sleeve and having the slot substantially extending from the second end to the first end;

(b) an elongated fastener extending through the sleeve head and slotted sleeve, the elongated fastener having a fixed head formed on the end thereof adjacent to the sleeve; and (c) an expanding head threadedly disposed on the fastener adjacent to the second end of the slotted sleeve, the expanding head being configured to advance along the fastener into the second end of the slotted sleeve when the fixed head is rotated, the slotted sleeve being configured such that the second end of the slotted sleeve is radially outwardly biased when the expanding head is first received therein and the slotted sleeve is subsequently axially compressed at the compression groove after the second end of the slotted sleeve is radially outwardly biased when the fixed head is further rotated.

24. A structural assembly comprising:

(a) a blind fastener as recited in claim 23;

(b) a component having an opening therein; and (c) a support member having a wall with an opening extending therethrough, the opening of the component and the support member being aligned, the blind fastener being passed through the aligned openings of the component and the support member such that:

(i) the fastener head is disposed on the side of the component opposite the support member; and (ii) at least a portion of the second end of the slotted sleeve is disposed on the side of the support member opposite the component, at least a portion of the second end of the slotted sleeve being freely spaced apart from the support member at a distance along the fastener.

25. A structural assembly as recited in claim 24, wherein the structural member comprises an elongated tubular member having an interior surface, the interior surface bounding a hollow channel, at least a portion of the second end of the slotted sleeve being freely disposed within the hollow channel.

\* \* \* \* \*

UNITED STATES PATENT AND TRADEMARK OFFICE
CERTIFICATE OF CORRECTION

PATENT NO. : 6,234,734 B1
DATED : May 22, 2001
INVENTOR(S) : Simon Klippel

Page 1 of 1

It is certified that error appears in the above-identified patent and that said Letters Patent is hereby corrected as shown below:

Column 6,
Line 5, before "portion 16" change "of-threaded" to -- of threaded --
Line 51, before "pipework" change "includes" to -- include --

Column 10,
Line 6, after "slotted sleeve" change "determining" to -- defining --
Line 7, after "encircling" change "tile" to -- the --
Line 18, after "expanding" change "bead" to -- head --

Signed and Sealed this

Seventh Day of May, 2002

Attest:

JAMES E. ROGAN
Attesting Officer
Director of the United States Patent and Trademark Office